United States Patent
Fyke et al.

(10) Patent No.: US 9,445,266 B2
(45) Date of Patent: Sep. 13, 2016

(54) SMART PLUG OR CRADLE

(71) Applicant: Research In Motion Limited, Waterloo (CA)

(72) Inventors: Steven Henry Fyke, Waterloo (CA); Douglas James Arthur Burrell, Waterloo (CA); Soussamay McManus, Waterloo (CA)

(73) Assignee: BlackBerry Limited, Waterloo (CA)

( * ) Notice: Subject to any disclaimer, the term of this patent is extended or adjusted under 35 U.S.C. 154(b) by 82 days.

(21) Appl. No.: 13/626,101

(22) Filed: Sep. 25, 2012

(65) Prior Publication Data

US 2014/0089547 A1    Mar. 27, 2014

(51) Int. Cl.
| | |
|---|---|
| *G06F 13/00* | (2006.01) |
| *H04W 12/06* | (2009.01) |
| *H04W 4/18* | (2009.01) |
| *H04W 84/12* | (2009.01) |
| *H04L 29/08* | (2006.01) |
| *H04L 29/06* | (2006.01) |

(52) U.S. Cl.
CPC ............. *H04W 12/06* (2013.01); *H04W 4/18* (2013.01); *H04L 63/0853* (2013.01); *H04L 67/1097* (2013.01); *H04W 84/12* (2013.01)

(58) Field of Classification Search
CPC ............. H04L 63/0272; H04L 63/08; H04L 12/4641; H04L 2209/76; H04W 92/06
USPC .................. 710/300–306; 455/411
See application file for complete search history.

(56) References Cited

U.S. PATENT DOCUMENTS

| | | | |
|---|---|---|---|
| 6,081,900 A * | 6/2000 | Subramaniam et al. | 726/19 |
| 7,155,526 B2 | 12/2006 | Chaudhary et al. | |
| 7,209,729 B2 * | 4/2007 | Oyagi et al. | 455/404.1 |
| 7,216,173 B2 * | 5/2007 | Clayton et al. | 709/227 |
| 7,356,539 B2 | 4/2008 | Brown | |
| 7,596,805 B2 | 9/2009 | Mimura et al. | |
| 7,904,628 B2 * | 3/2011 | Groesch | 710/303 |
| 7,912,503 B2 * | 3/2011 | Chang et al. | 455/557 |
| 7,941,528 B2 * | 5/2011 | Hicks et al. | 709/224 |
| 8,208,425 B2 | 6/2012 | Karaoguz et al. | |
| 8,261,338 B2 | 9/2012 | Brown | |
| 8,271,713 B2 * | 9/2012 | Grady et al. | 710/303 |
| 8,365,215 B2 * | 1/2013 | Hicks et al. | 725/32 |

(Continued)

FOREIGN PATENT DOCUMENTS

WO    2012010210 A1    1/2012

OTHER PUBLICATIONS

EP application No. 12185961.5, Extended European Search Report dated Aug. 2, 2013.

(Continued)

*Primary Examiner* — Tim T Vo
*Assistant Examiner* — Kim T. Huynh
(74) *Attorney, Agent, or Firm* — Moffat & Co.

(57) ABSTRACT

There is provided a method and apparatus for allowing a user of a mobile device to securely access a storage device of a home network of the user. The method and apparatus advantageously allow for the user to share data stored on the home network with other users, or to give full or restricted access to other computing devices. The apparatus consists of a network element residing on the home network of the user, which enables communications between the network storage and the mobile device when the mobile device is in a remote location.

19 Claims, 6 Drawing Sheets

(56) References Cited

U.S. PATENT DOCUMENTS

| | | | |
|---|---|---|---|
| 8,566,417 B2* | 10/2013 | Belimpasakis et al. | 709/216 |
| 8,671,425 B2* | 3/2014 | Hicks et al. | 725/32 |
| 2002/0199007 A1* | 12/2002 | Clayton et al. | 709/230 |
| 2006/0068785 A1* | 3/2006 | Kamijo et al. | 455/435.1 |
| 2006/0224601 A1 | 10/2006 | Brown | |
| 2007/0086724 A1* | 4/2007 | Grady et al. | 386/46 |
| 2008/0005440 A1* | 1/2008 | Li et al. | 710/303 |
| 2008/0089658 A1* | 4/2008 | Grady et al. | 386/46 |
| 2008/0089667 A1* | 4/2008 | Grady et al. | 386/96 |
| 2008/0092200 A1* | 4/2008 | Grady et al. | 725/133 |
| 2008/0104301 A1* | 5/2008 | Assouad et al. | 710/303 |
| 2008/0138028 A1* | 6/2008 | Grady et al. | 386/1 |
| 2008/0289001 A1 | 11/2008 | Brown | |
| 2009/0023475 A1* | 1/2009 | Chang et al. | 455/557 |
| 2010/0042671 A1 | 2/2010 | Natt et al. | |
| 2010/0217871 A1 | 8/2010 | Gammon | |
| 2011/0093712 A1* | 4/2011 | Jin et al. | 713/171 |
| 2011/0136541 A1* | 6/2011 | Chang et al. | 455/558 |
| 2011/0167176 A1* | 7/2011 | Yew et al. | 710/6 |
| 2011/0270952 A1* | 11/2011 | Ray et al. | 709/218 |
| 2012/0151022 A1* | 6/2012 | Ayyagari et al. | 709/222 |
| 2012/0158900 A1 | 6/2012 | Kim et al. | |

OTHER PUBLICATIONS

Canadian Intellectual Property Office, Office Action, Application No. 2828258, May 1, 2015.

European Patent Office, Office Action on Application No. 12185961.5, Issued on Feb. 19, 2016.

* cited by examiner

SMART PLUG OR CRADLE

FIELD OF THE DISCLOSURE

The present disclosure relates to a mobile device, and in particular relates to data access and sharing for mobile devices.

BACKGROUND

Users of mobile devices frequently share documents between each other using various means. In some cases, documents can be shared using email or messaging applications, or through social networks.

However, in some cases, a user of a mobile device may want to share or access documents which are stored on the user's home network, without necessarily granting anyone else access to the user's home network.

Accordingly, there is a need for a solution allowing users of a mobile device to share, from a remote location, documents stored on the user's home network.

BRIEF DESCRIPTION OF THE DRAWINGS

The present application will be better understood with reference to the drawings, in which.

DETAILED DESCRIPTION OF THE DRAWINGS

The present disclosure provides for a method and apparatus for facilitating the sharing of documents stored on a home network, as described in detail below.

Thus, the present disclosure provides an apparatus for providing access to a Local Area Network (LAN) data storage to a mobile device, comprising a processor and a communications subsystem, wherein the processor and communication subsystem cooperate to receive a request from the mobile device, the request including at least one operation to be performed on the LAN storage, perform the at least one operation on the LAN storage, and if one of the at least one operation on the LAN storage is a read operation, sending a result of the read operation to the mobile device The present disclosure further provides a method, at an apparatus connected to a Local Area Network (LAN) for providing access to a LAN data storage to a mobile device, comprising receiving a request from a mobile device, the request including at least one operation to be performed on the LAN data storage, performing the at least one operation on the LAN data storage, and if one of the at least one operation on the LAN storage is a read operation, sending a result of the read operation to the mobile device.

Figure 1:
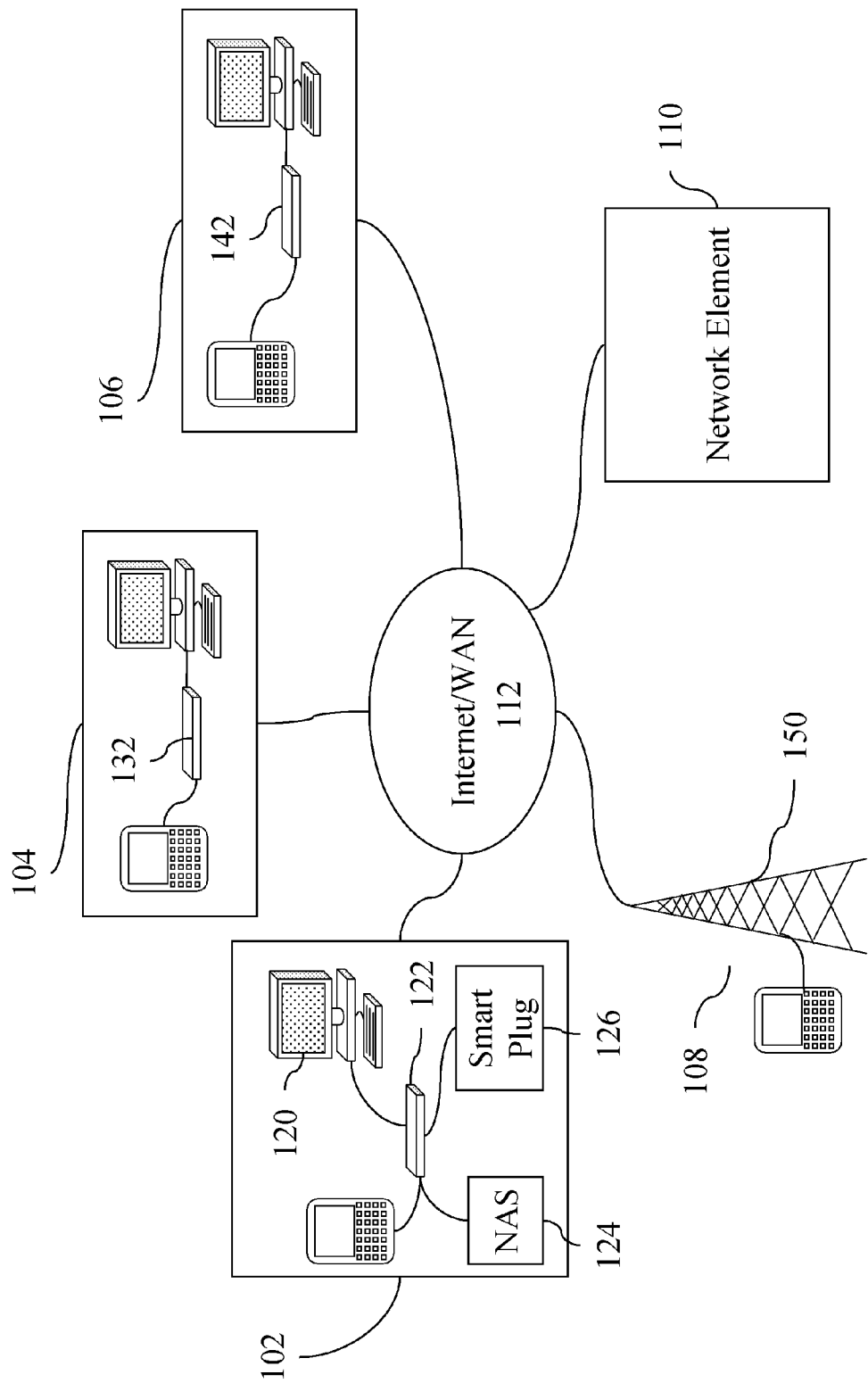
FIG. 1 is a block diagram showing a network configuration in accordance with the present disclosure.

Reference is now made to FIG. 1, which shows an exemplary architecture for a network including a smart plug. In accordance with FIG. 1, the architecture includes a home location 102, and remote locations 104, 106, and 108. Each of home locations 102, and remote locations 104, 106 and 108 are connected to the Internet 112, however the present disclosure is not limited to the Internet and other wide area networks are within the scope of the present disclosure.

The home location 102 may include at least one computer 120, which is connected to a router 122. Computer 120 may be a personal computer, a laptop computer, or any other computing device which may connect to router 122. Router 122 is connected to the Internet and may also provide a local area network (LAN) or a wireless local area network (WLAN) such as a Wi-Fi™ network.

Home location 102 may further include Network Accessible Storage (NAS) 124 and a smart plug 126, which will be described in greater detail below. In some embodiments, NAS 124 may be integrated within smart plug 126. In other embodiments, NAS 124 may be integrated within computer 120, or may be provided as a standalone element.

Computer 120, NAS 124, and smart plug 126 are each connected to the WLAN of home location 102.

Remote locations 104 and 106 also include routers 132 and 142 for connecting to the Internet and for providing a LAN or a WLAN. Computers 130 and 140 are connected to routers 132 and 142, respectively.

Remote location 108 includes wireless network 150. Such networks may include, but are not limited to cellular networks, Wi-Fi, and WiMAX networks, among others. In the embodiment of FIG. 1, wireless network 150 is connected to the Internet.

FIG. 1 further illustrates network element 110, which is described in greater detail below.

Figure 2:
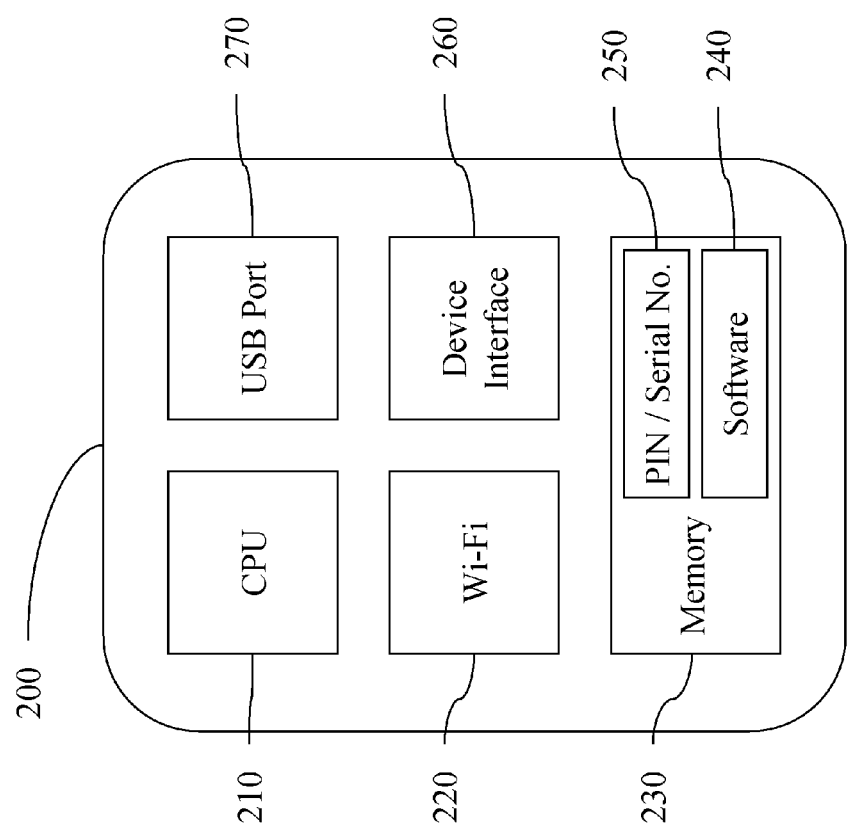
FIG. 2 is a block diagram of an example smart plug in accordance with one embodiment of the present disclosure.

Reference is now made to FIG. 2 which shows a block diagram of a smart plug in accordance with an embodiment of the present disclosure.

Smart plug 200 is a network appliance for facilitating the sharing of data between a mobile device and a home network. In some embodiments, smart plug 200 may also act as a charger for the battery of a mobile device, but the present disclosure is not so limited and in some embodiments the smart plug 200 does not include a charger.

The smart plug 200 comprises a processor 210, a communications subsystem 220, which may for example include a Wi-Fi™ chipset and radio, memory 230, and a device interface 260. The smart plug 200 may further include a Universal Serial Bus ('USB') port 270.

The smart plug 200 may further comprise an Ethernet port for connecting to the home network using a wired connection.

In some embodiments, the device interface 260 consists of the USB port 270, and in other embodiments the device interface 260 is distinct from the USB port 270. In some embodiments, the device interface consists of a short range wireless interface such a Bluetooth™.

In a further embodiment, the device interface consists of a port which facilitates communications between the smart plug and a mobile device, and which charges the mobile device's battery. Such a port could consist of USB port 270, an additional USB port, other ports known in the art, or a proprietary port. In at least one embodiment, the smart plug includes a cradle for receiving the mobile device, such that when the mobile device is placed in the cradle it is connected to the smart plug through a port.

The smart plug of the present disclosure provides a mobile device with connectivity to the home network in which it resides. To achieve this, the smart plug associates itself to a mobile device.

The mobile device may have a smart plug application to communicate with the smart plug. This application can be provided to the mobile device through various ways, including at the time of manufacture, an application repository on the wireless network or on the Internet, through provisioning to the device, among other possibilities. Alternatively the smart plug application can be provided to the mobile device when the mobile device is first connected to the smart plug.

In at least one embodiment, the smart plug is associated with a mobile device by plugging the mobile device through device interface 260. If the mobile device does not have a smart plug application installed, the smart plug could fetch the smart plug application from its memory, and install it on the mobile device. Otherwise, the mobile device may detect the connection to the smart plug, and launch the smart plug application automatically.

Once the smart plug application is running, the mobile device may authenticate itself to the smart plug. In at least one embodiment, the smart plug is provided with a unique identification number or a serial number, which could be provided on the smart plug's original packaging or the like. The identification or serial number maybe entered into the smart plug application on the mobile device, and the mobile device authenticates itself with the smart plug by sending, at least in part, the identification or serial number to the smart plug.

The smart plug then either confirms that the proper identification or serial number has been provided, or denies further access to the mobile device until the proper identification or serial number has been provided. In the event of the proper identification or serial number having been provided, the smart plug may record identifying information of the mobile device.

In at least one embodiment, once identified with each other, the smart plug and the mobile device exchange encryption keys to ensure that their future communications are secure. In one embodiment, the smart plug and the mobile device use symmetric encryption, and only one key is exchanged. In such an embodiment, the smart plug may generate an encryption key using random data, and share that key with the mobile device through device interface 260. In another embodiment, the smart plug and the mobile device may use asymmetric encryption, requiring two public and private key pairs. These public and private key pairs can be established using any known means in the art such as the Diffie-Hellman key exchange, but the present disclosure is not so limited.

The exchange of keys between the smart plug and the mobile device may be repeated periodically. In one embodiment, the encryption key or keys are refreshed according to a pre-determined schedule, such as at the start of each month. In yet another embodiment, the encryption key or keys are refreshed when the mobile device is connected to the smart plug through device interface 260.

If required, once the mobile device and the smart plug have exchanged keys, the mobile device may provide the smart plug with Wi-Fi™ credentials, or other information required for the smart plug to connect to the WLAN. This step may be automated if the mobile device is already connected to the WLAN and holds that information, or the information could be manually provided through the smart plug application on the mobile device. However, this step may be omitted if the smart plug is connected to a LAN through a wired connection such as an Ethernet connection.

In at least one embodiment, the smart plug further includes a router, and is used as a router for the home network.

In one embodiment, the smart plug may allow remote access of data at home location 102. However, before the mobile device starts communicating with the smart plug from a remote location, the mobile device needs the IP address of the home network and the subnet address of the smart plug. This information may be provided to the mobile device through device interface 260 as soon as the smart plug is connected to the home network, or can be entered manually.

Once the smart plug has authenticated the mobile device, the smart plug and the mobile device share keys, and the smart plug is connected to a WLAN or a LAN, the smart plug may begin to operate normally.

The mobile device may then communicate with the smart plug from a remote location, over the Internet. For example, if the mobile device is in remote location 108, the mobile device is connected to the Internet via the wireless network 150. Accordingly, the mobile device may send data addressed to the smart plug.

The smart plug receives data from the mobile device, and authenticates the data as coming from the mobile device to which it is associated. The authentication of the mobile device may occur using any means known in the art. In at least one embodiment, the mobile device provides the smart plug with its identifying information encrypted with a shared key or a public key of the mobile device. However, the present disclosure is not so limited.

The smart plug may also authenticate itself to the mobile device using any means known in the art.

Once the mobile device is authenticated, the mobile device and the smart plug may communicate securely with their shared key or their respective private/public key pairs.

Specifically, the mobile device may communicate with the smart plug in order to access NAS 124. The mobile device may perform any operation which is typically available on storage mediums, such as reading a file, reading the contents of a folder, moving a file, moving a folder, writing a file, deleting a file or a folder, and the like.

For example, if the user of the mobile device wishes to know the contents of a folder, the folder may be selected through an interface, such as a user interface of the smart plug application on the mobile device. The smart plug application would then send a message to the smart plug including a read operation on the selected folder. In response, the smart plug may send a message including a list of the content of the selected folder. If the selected folder does not exist, or if the operation failed for other reasons, an error code is returned to the mobile device.

As would be appreciated by those skilled in the art, the user of the mobile device may also wish to get a file from NAS 124. As in the above example, the user may select a file through a user interface of the smart plug application on the mobile device, and the smart plug application may then send a message to the smart plug including a read operation on the selected file. In response, the smart plug sends the file content, if successful, or an error message otherwise.

Similarly, the user may store a file from the mobile device storage to the smart plug. In this case, the smart plug application on the mobile device may send a message including a write operation, the selected file and the folder in which to store the file. In response, the smart plug either sends a message indicating the operation was successful, or an error message.

Other operations will be apparent to those skilled in the art and the present disclosure is not limited to the above examples.

In some cases the home network to which the smart plug is connected will have a dynamic IP address, and therefore the IP address stored on the mobile phone needs to be updated periodically.

In at least one embodiment, the smart plug will periodically determine the IP address of the network it is connected to, and if the IP address has changed, a message will be sent to the mobile device from the smart plug notifying the mobile device of the new IP address.

In at least another embodiment, each of the smart plug and the mobile device are associated to network element 110. The association between the smart plug or the mobile device with network element 110 may have been established at the time of manufacture, or at a later time, through means known in the art. However, for the purpose of the present disclosure, it is assumed that network element 110 is known and trusted by both the mobile device and the smart plug, and that network element 110 can establish a secure channel with both the mobile device and the smart plug, by means of a shared key or established private/public key pairs.

Furthermore, in at least one embodiment, network element 110 maintains a table of association between mobile devices and associated smart plugs.

In such an embodiment, the smart plug will periodically determine the IP address of the network it is connected to, and if the IP address has changed, a message will be sent to network element 110 through a secure channel, notifying the change in IP address. If the network element maintains a table of association between mobile devices and smart plugs, network element 110 will perform a look-up in the table to determine which mobile device or devices are associated to the smart plug. Otherwise, the message from the smart plug will specify which mobile device the message should be forwarded to.

The network element 110 then establishes a secure channel with the mobile device and sends the mobile device the new IP. Alternatively, the network element may store the new IP and provide it to the mobile device via a secure channel upon the mobile device requesting this information.

Figure 3:
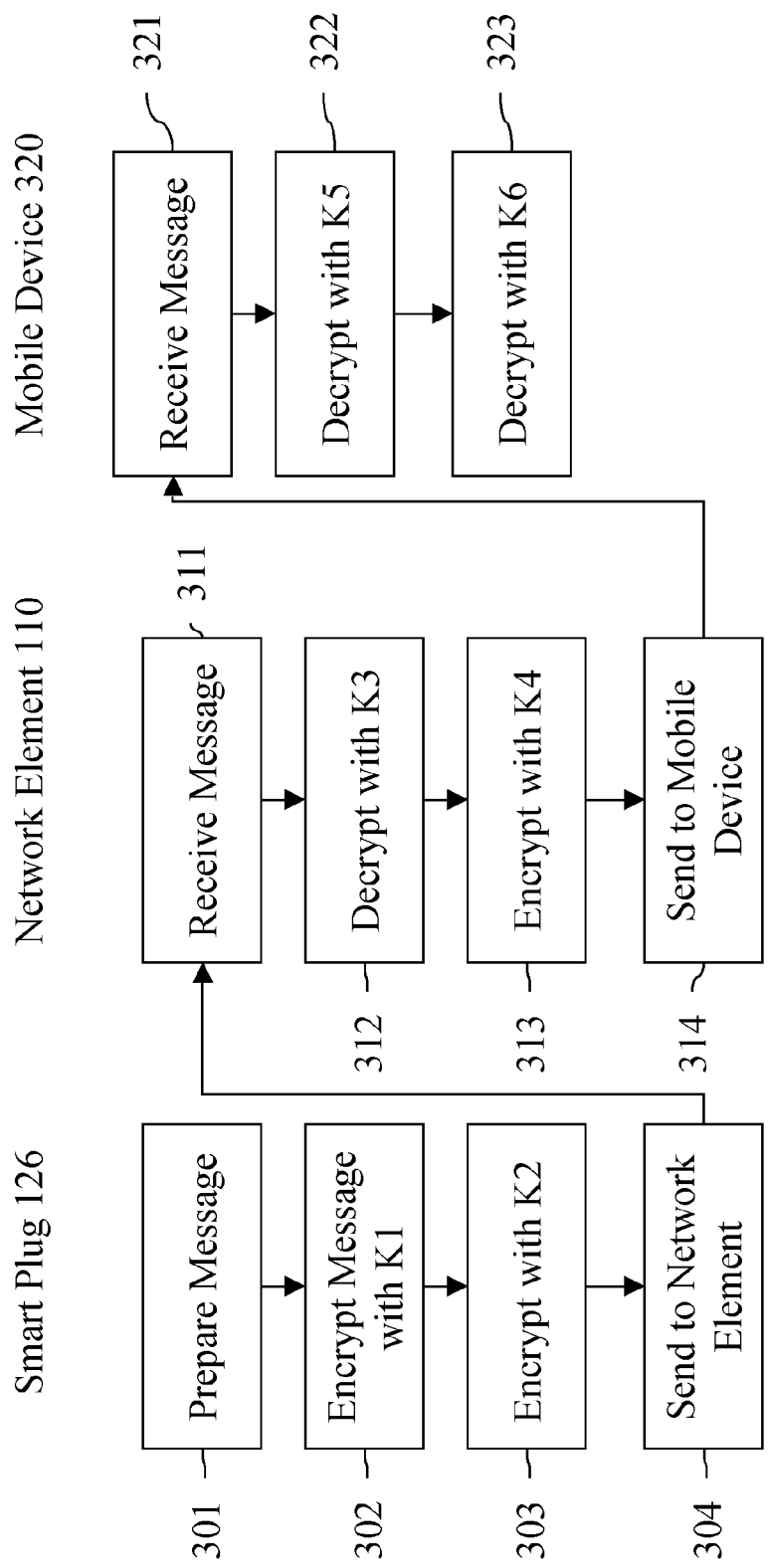
FIG. 3 is a flow chart of a method of communicating between a smart plug and a remote mobile device in accordance with one embodiment of the present disclosure.

Furthermore, in some embodiments, all communications between the smart plug and the mobile device in a remote location are mediated by network element 110. Reference is made to FIG. 3 which shows a flowchart of such communications. FIG. 3 is divided into columns to highlight at what element each step is performed.

The process starts at block 301 in which the smart plug 126 prepares a message for transmission to the mobile device. The process could also start by the mobile device preparing a message for transmission, in which case the roles of the smart plug and the mobile device would be reversed.

At block 302, the smart plug encrypts the message with encryption key K1. Encryption key K1 is the encryption key used by the smart plug for communicating securely with the mobile device. Thus, if the smart plug and the mobile device have a shared key for symmetric encryption, K1 corresponds to the shared key. If the smart plug and the mobile device use asymmetric encryption, K1 is the mobile device's public key. For the purpose of the present disclosure, a message encrypted with K1 is represented as K1 (message).

At block 303, K1 (message) is encrypted with encryption key K2. Encryption key K2 is the encryption key used by the smart plug for communicating securely with network element 110. As in the above case, K2 is either a shared key between the smart plug and network element 110, or the network element's public key.

At block 304, K2(K1 (message)) is transmitted to the network element 110, and the network element 110 receives K2(K1 (message)) at block 311. Network element 110 decrypts the received data with encryption key K3 at block 312, which produces K1 (message). As would be appreciated by those skilled in the art, K3 is either a key shared between the smart plug and the network element, in which case, K2 is equal to K3, or K3 is the network element's private key.

At block 313, the network element encrypts K1 (message) with K4, which produces K4(K1 (message)). K4 is either a shared key between the network element 110 and the mobile device 320 or the mobile device's public key. The mobile device may have a public key for communication with the smart plug, and another, distinct public key for communication with the network element 110. K4(K1 (message)) is then transmitted to the mobile device at block 314 and received at block 321.

At block 322, the mobile device 320 decrypts K4(K1 (message)) with encryption key K5, which produces K1 (message). K5 is either a key shared between the mobile device and the network element 110, in which case K5 is equal to K4, or K5 is the mobile device's private key for communicating with the network element 110.

The mobile device 320 then decrypts K1 (message) with K6 at block 323, which provides the mobile device with the message as prepared by the smart plug. K6 is either a key shared between the mobile device and the smart plug, in which case K6 is equal to K1, or K6 is the mobile device's private key for communicating with the smart plug.

Therefore, the mobile device and the smart plug can communicate through a network element 110 in a secure fashion.

Once the smart plug can communicate securely with the mobile device from a remote location, the mobile device may access data stored in NAS 124 or store data in NAS 124.

In at least one embodiment, additional mobile devices can be granted partial or complete, and temporary or permanent access to data on home network 102, such as data within the NAS 124, through the smart plug.

In one embodiment, when an additional mobile device connects to the home network at home location 102, the smart plug will notify the mobile device to which it is associated. In response, the mobile device may grant the additional mobile device with access to all or part of the data in a storage location such as the NAS 124.

For example, the mobile device may send a message to the smart plug instructing it to grant the additional mobile device read permission for a given folder or subfolder. As would be appreciated by those skilled in the art, the mobile device may also send a message to the smart plug instructing it to grant the additional mobile device read and write permission to all folders of the NAS 124.

Upon being granted permissions to NAS 124 by the first mobile device, the additional mobile device would then install the smart plug application, or verify that it is already installed, and establish encryption keys with the smart plug to enable secure communications, as described above in relation to the first mobile device.

The additional mobile device would then have access to the NAS 124 from a remote location, just as the first mobile device, with the exception that the additional mobile device is restricted by the permissions set by the first mobile device.

The first mobile device may also grant temporary access to the NAS 124 to an additional computing device. As with the mobile device, the additional computing device may require a smart plug application in order to communicate with the smart plug and access NAS 124.

The additional computing device may be any kind of computing device having access to the Internet, such as a personal computer, a laptop computer, or a mobile device.

When the mobile device associated with the smart plug can establish secure communications with the computing device, the mobile device may issue a token to the computing device granting it access to NAS 124 for a predetermined period of time. However, if no method of secure communications is available between the mobile device and the computing device, in one embodiment no token is issued as providing a token over an unsecured channel would compromise the security of NAS 124.

In at least one embodiment the computing device is a personal computer, a laptop computer or a mobile device connected to a home network at location 104. In this scenario, the mobile device may issue a token to the computing device securely when the mobile device is also connected to the network at location 104.

In another embodiment, the computing device is another mobile device which is connected to a wireless network. In this scenario, the mobile device may issue a token to the computing device securely if the two mobile devices have the means to communicate securely between them. For example, two mobile devices may communicate securely by using Blackberry™ Messenger or the like.

Figure 4:
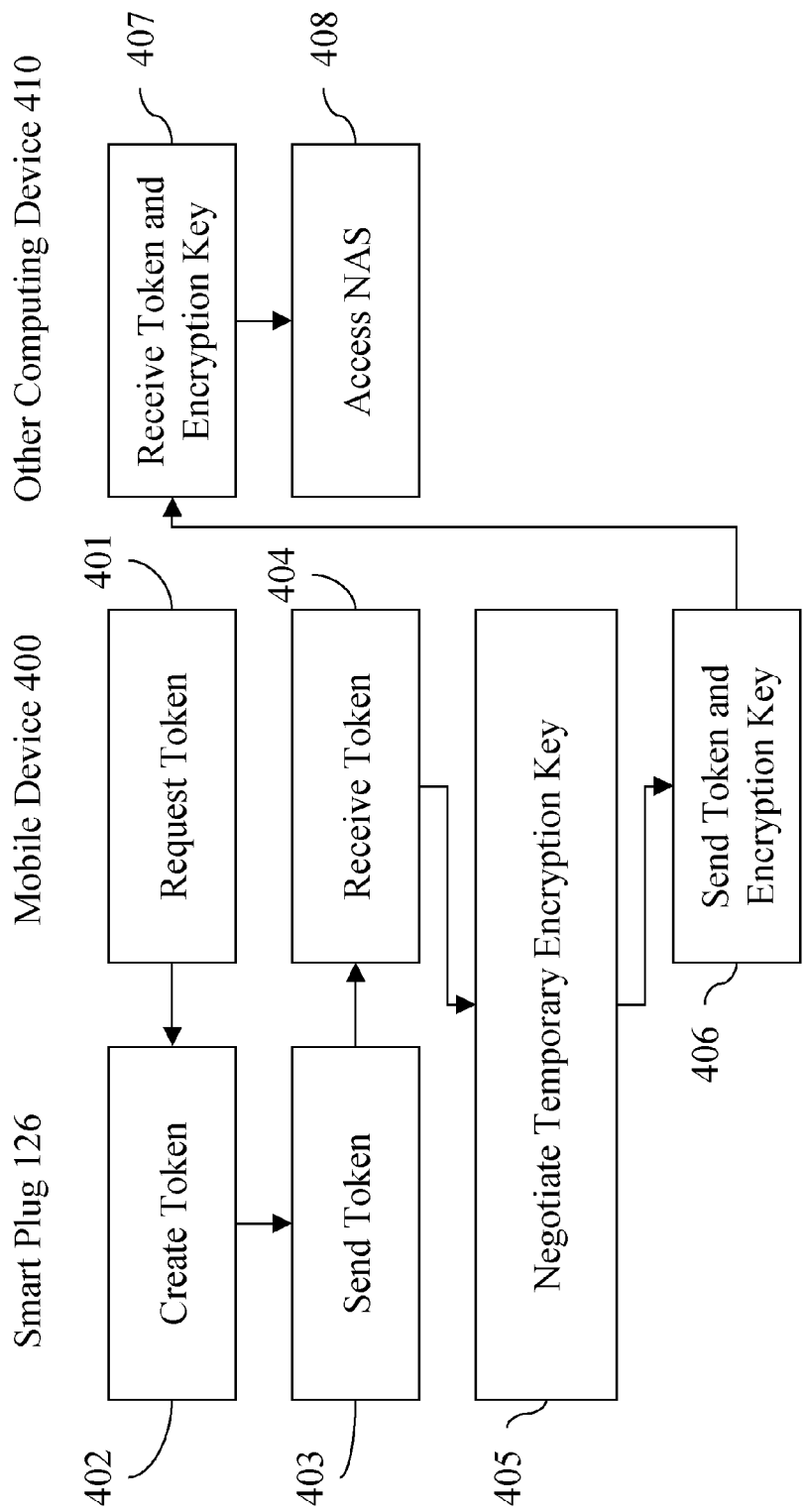
FIG. 4 is a flow chart of a method of granting an additional computing device a token for communicating with the smart plug in accordance with one embodiment of the present disclosure.

The method of issuing a token will now be described with reference to FIG. 4.

The method starts at block 401 in which the mobile device requests a token from the smart plug. The request specifies identifying information for the computing device for which the token is intended, such as an IP address, a phone number, a serial number, or the like. The request may further specify which folders or portions of the NAS the token should grant access to, under what permissions (namely Read-Only or Read-Write), and for how long.

At block 402, the smart plug creates a token. The token is any random bit-string created by the smart plug, the knowledge of which by an external computing device grants the external computing device access to the NAS 124, under the conditions associated to the token. The token is stored in memory by the smart plug, along with the conditions provided in the request, namely which portions of the NAS the token grants access to, the permissions under which access is granted, and the duration of the access.

The smart plug 126 sends the newly created token to the mobile device 400 at block 403, and the token is received by the mobile device 400 at block 404.

At block 405, the mobile device 400 and the smart plug establish temporary encryption keys for communications between the smart plug and the computing device for which the token is intended. However, the specific method by which keys are established, and the specific method of encryption, is not limited by the present disclosure. Further, the encryption keys could be established between the smart plug and the computing device for which the token is intended. However, since the mobile device 400 and the smart plug 126 already benefit from a secure communication channel, it is more secure for the keys to be established between the mobile device 400 and the smart plug 126.

At block 406, the token and the encryption keys are provided from the mobile device to the additional computing device, and these are received at the additional computing device at block 407.

At block 408, the additional computing device 410 can initiate communications with the smart plug 126, by identifying itself using the identifying information originally provided in the request of block 401, and by providing the token, encrypted with the encryption keys.

Once the smart plug has verified that the additional computing device has provided a correct token, the smart plug grants the additional computing device access to the NAS 124 as defined by the conditions included in the request of block 401, and within these conditions, the additional computing device may communicate with the smart plug in the same manner as the mobile device associated to the smart plug.

In at least one embodiment, once the additional computing device has been authenticated by the smart plug as having provided a correct token, the additional computing device and the smart plug use the secure channel as provided by the encryption keys established at block 405, to establish new encryption keys, and the previous encryption keys are discarded. In another embodiment, the encryption keys established at block 405 are used for all communications between the additional computing device and the smart plug.

Once two mobile or computing devices share an association with the smart plug, they may use the smart plug to establish a secure connection between each other. For example, the smart plug application on each mobile device may maintain a list of mobile device having access to the smart plug. A user of one such mobile device may wish to send data to another such user, and may wish to send this data through the smart plug, in order to benefit from an extra layer of encryption.

In one embodiment, the mobile or computing devices involved in this transaction could communicate securely by using the smart plug as a relay, in which data is first transmitted from the sender to the smart plug through a first secure channel, and then transmitted from the smart plug to the receiver through a second secure channel.

In another embodiment, the mobile devices involved in the transaction first establish encryption keys, namely a shared key, or respective public and private key pairs. As the mobile devices already benefit from a secure channel as provided by the smart plug, they may establish keys securely. Further communications between the mobile devices will then be subjected to an additional layer of encryption based on the newly established keys.

Figure 5:
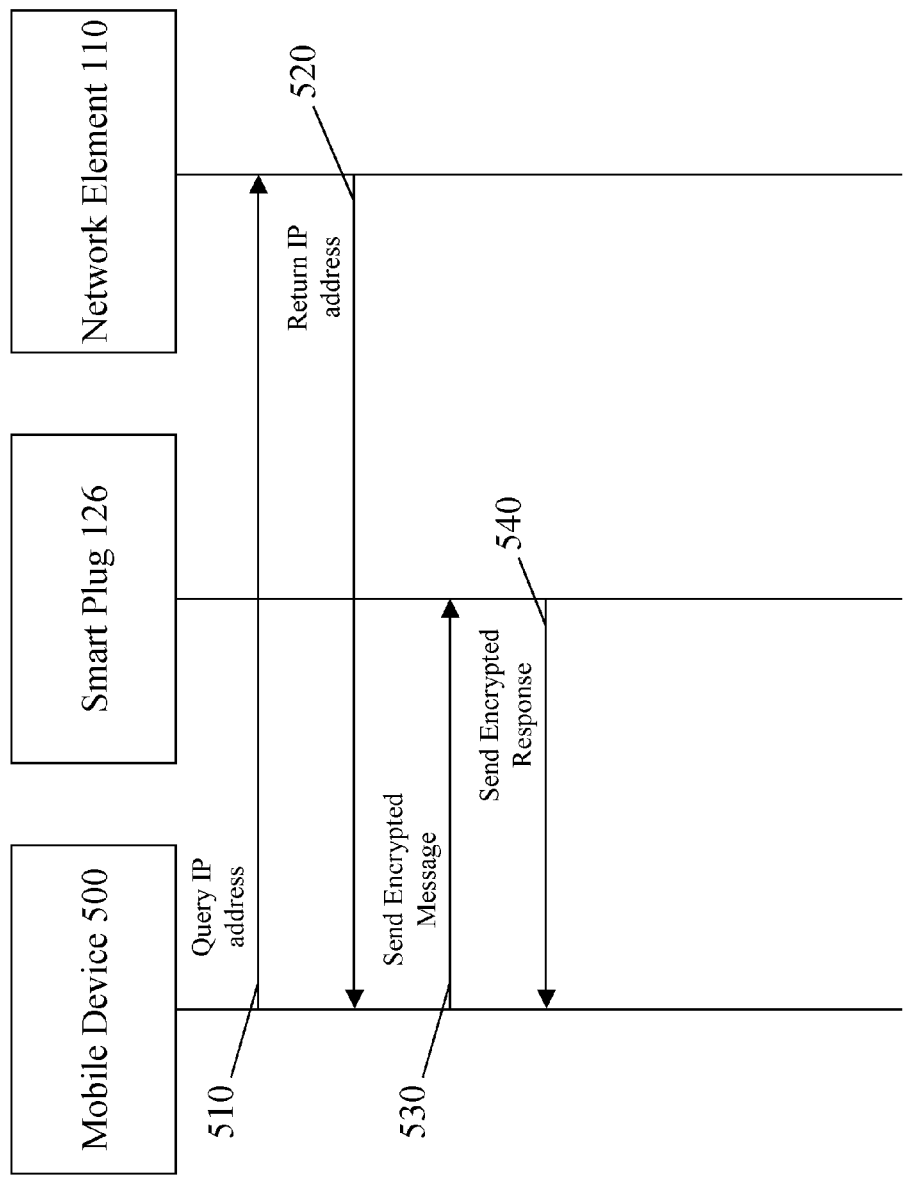
FIG. 5 is a flow chart of communicating between a smart plug and a remote mobile device in accordance with one embodiment of the present disclosure.

Reference is now made to FIG. 5, which illustrates communications between the smart plug and a mobile device, according to at least one embodiment.

The process starts at arrow 510, in which the mobile device 500 queries network element 110 for the IP address of the smart plug 126. Although the mobile device 500 may already have an IP address for the smart plug stored in memory, the IP address of the smart plug may be a dynamic IP address, therefore the IP address stored in the memory of mobile device 500 may not be valid anymore. In another embodiment, the new IP address of the smart plug 126 is pushed to the mobile device 500 as soon as the smart plug 126 realizes its IP address is changed.

As shown at arrow 520, network element responds by returning the IP address to the mobile device 500.

When mobile device 500 has the up-to-date IP address of the smart plug 126, the mobile device may send messages to the smart plug 126 directly, as illustrated by arrow 530. In some embodiments, the message is encrypted using encryption keys negotiated between the mobile device 500 and the smart plug 126. For example, in one embodiment, the message is encrypted using a shared key, and in another embodiment, the message is encrypted using a public key of a public-private key pair.

After having received and decrypted the message, smart plug 126 responds as shown by arrow 540. In some embodiments, the response is encrypted using a shared key or the public key of a public-private key pair.

Further, the above may be implemented using any mobile device having data capability. One exemplary device is described below with regard to FIG. 6.

Mobile device 600 is typically a two-way wireless communication device having voice and data communication capabilities. Mobile device 600 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a mobile device, or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate. The radio frequency front end of communication subsystem 611 can be any of the embodiments described above.

Network access requirements will also vary depending upon the type of network 619. In some networks network access is associated with a subscriber or user of mobile device 600. A mobile device may require a removable user identity module (RUIM) or a subscriber identity module (SIM) card in order to operate on a network. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information.

Figure 6:
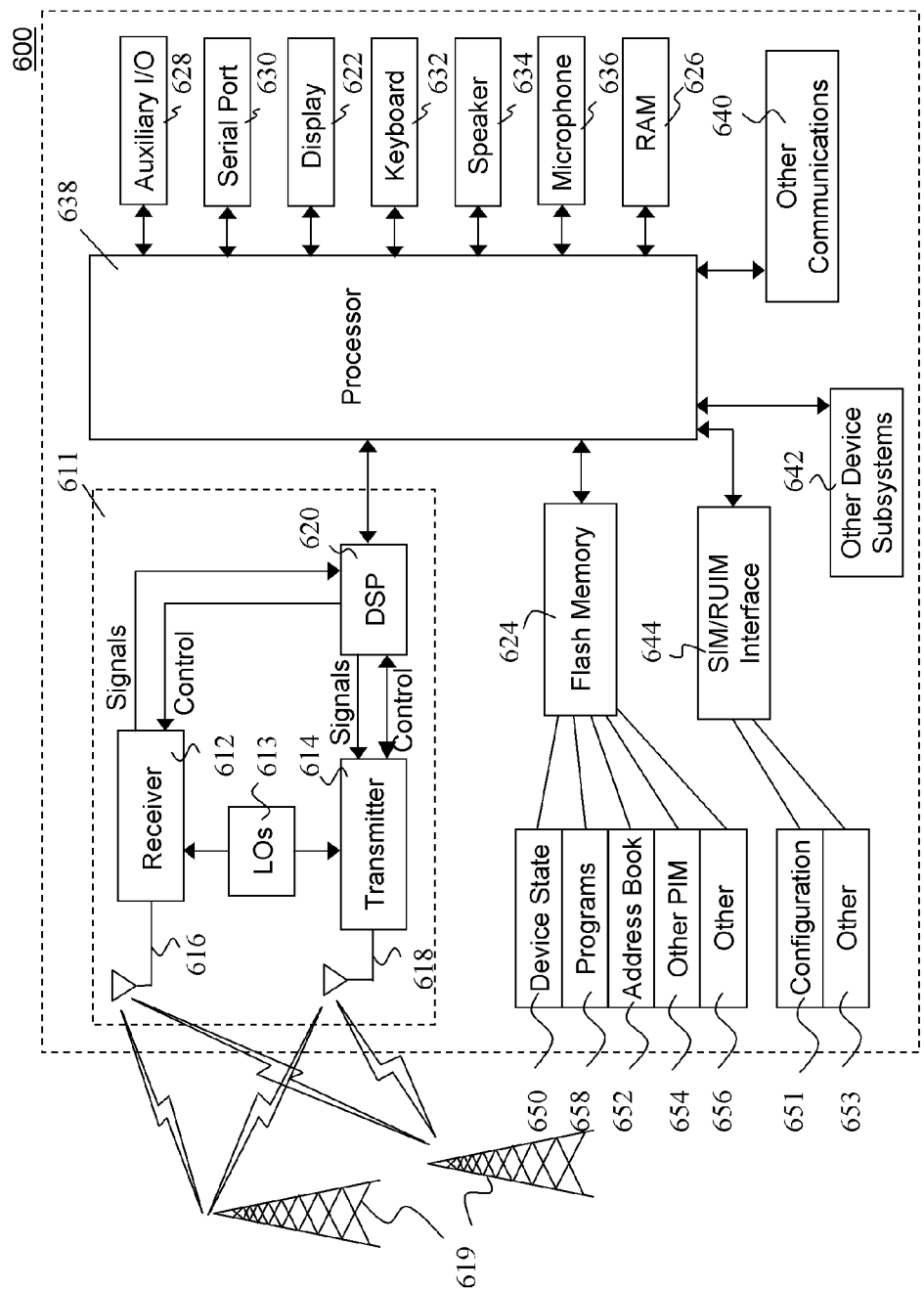
FIG. 6 is a block diagram of an example mobile device.

When required network registration or activation procedures have been completed, mobile device 600 may send and receive communication signals over the network 619. As illustrated in FIG. 6, network 619 can consist of multiple base stations communicating with the mobile device.

Signals received by antenna 616 through communication network 619 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 619. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem or to a power source for charging.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. An apparatus for providing access to a Local Area Network (LAN) data storage to a mobile device, comprising:
   a processor;
   a communications subsystem; and
   a memory;
   wherein the processor and communication subsystem are configured to:
      detect that the mobile device is in proximity to the apparatus;
      while the mobile device is in proximity to the apparatus:
         receive an authentication code from the mobile device, the authentication code being based on a unique identifier;
         verify that the unique identifier corresponds to a unique identifier of the apparatus; and
         upon said verifying, establish an encryption key with the mobile device:
      after the encryption key has been established:
         receive, over the LAN, a request from the mobile device, the request including at least one operation to be performed on the LAN storage, the request being encrypted with the encryption key;
         perform the at least one operation on the LAN storage; and
         if one of the at least one operation on the LAN storage is a read operation, send a result of the read operation to the mobile device.

2. The apparatus of claim 1, wherein the apparatus further comprises a Universal Serial Bus ('USB') port, and wherein the LAN data storage comprises a USB key connected to the USB port.

3. The apparatus of claim 1, further comprising a device interface, for connecting to the mobile device when the mobile device is in proximity to the apparatus.

4. The apparatus of claim 3, wherein the device interface comprises a USB port.

5. The apparatus of claim 3, wherein the device interface uses Bluetooth.

6. The apparatus of claim 3, wherein the device interface further includes a charger, for charging a battery of the mobile device.

7. The apparatus of claim 3, wherein the device interface comprises a cradle for receiving the mobile device, the cradle including a port for connecting to the mobile device when the mobile device is placed in the cradle.

8. The apparatus of claim 1, wherein the communications subsystem enables connection to a Wi-Fi network.

9. The apparatus of claim 1, wherein the processor and the communications subsystem are further configured to:
   periodically check an Internet Protocol (IP) address of the apparatus;
   if the IP address of the apparatus has changed, notify the mobile device of the new IP address.

10. A method, at an apparatus connected to a Local Area Network (LAN) for providing access to a LAN data storage to a mobile device, comprising:
   detecting that the mobile device is in proximity to the apparatus;
   while the mobile device is in proximity to the apparatus:
      receiving an authentication code from the mobile device, the authentication code being based on a unique identifier;

verifying that the unique identifier corresponds to a unique identifier of the apparatus; and upon said verifying, establishing an encryption key with the mobile device;

after the encryption key has been established:

receiving, over the LAN, a request from a mobile device, the request including at least one operation to be performed on the LAN data storage, the request being encrypted with the encryption key;

performing the at least one operation on the LAN data storage; and if one of the at least one operation on the LAN storage is a read operation, sending a result of the read operation to the mobile device.

11. The method of claim 10, wherein the apparatus comprises a device interface for connecting to the mobile device when the mobile device is in proximity to the apparatus.

12. The method of claim 11, wherein the device interface is a Universal Serial Bus ('USB') port.

13. The method of claim 11, wherein the device interface uses Bluetooth.

14. The method of claim 11, wherein the device interface further includes a charger, for charging a battery of the mobile device.

15. The method of claim 11, wherein the device interface comprises a cradle for receiving the mobile device, the cradle including a port for connecting to the mobile device when the mobile device is placed in the cradle.

16. The method of claim 10, wherein the LAN comprises a Wi-Fi network.

17. The method of claim 10, further comprising:

periodically checking an Internet Protocol (IP) address of the apparatus; and if the IP address of the apparatus has changed, notify the mobile device of the new IP address.

18. The method of claim 10, wherein the LAN storage is a USB key connected to a USB port of the apparatus.

19. A non-transitory computer readable medium having executable code stored thereon for execution by a processor of an apparatus, the executable code containing instructions for:

detecting that the mobile device is in proximity to the apparatus;

while the mobile device is in proximity to the apparatus:

receiving an authentication code from the mobile device, the authentication code being based on a unique identifier;

verifying that the unique identifier corresponds to a unique identifier of the apparatus; and upon said verifying, establishing an encryption key with the mobile device;

after the encryption key has been established:

receiving, over the LAN, a request from a mobile device, the request including at least one operation to be performed on a Local Area Network (LAN) data storage, the request being encrypted with the encryption key;

performing the at least one operation on the LAN data storage; and if one of the at least one operation on the LAN storage is a read operation, sending a result of the read operation to the mobile device.

* * * * *